United States Patent Office 3,363,013
Patented Jan. 9, 1968

3,363,013
CHLORINATION PROCESS
Glendon D. Kyker, Chattanooga, Tenn., assignor to Velsicol Chemical Corporation, Chattanooga, Tenn., a corporation of Tennessee
No Drawing. Filed May 20, 1965, Ser. No. 457,514
11 Claims. (Cl. 260—651)

This invention relates to a process for chlorinating aliphatic side chains of aromatic compounds. More particularly, this invention relates to a process for the selective chlorination of aliphatic side chains of aromatic compounds wherein nuclear chlorination is inhibited.

In the production of aromatic compounds having chlorinated aliphatic side chains, such as benzyl chloride, benzal chloride and benzotrichloride, it is often desirable to obtain these compounds substantially free of nuclear chlorinated compounds. However there are a number of factors involved in the known chlorination processes which favor nuclear chlorination such as the absence of light, the presence of moisture, numerous metallic substances and acidic components. Iron contamination of reactants and equipment greatly effects nuclear chlorination as well as promotes Friedel-Crafts type condensations to occur, both contributing to lowered purity of product and in some cases complete resinification. The presence of light promotes side chain chlorination and may simultaneously permit nuclear chlorination. Under the most ideal conditions for side chain chlorination, which is impractical to obtain for plant scale or even small scale laboratory operations, traces of nuclear chlorinated compounds are obtained in the product. Thus there is a present need for a process whereby nuclear chlorination is substantially reduced and aliphatic side chains of aromatic compounds are produced substantially free of nuclear chlorinated compounds.

Therefore it is one object of the present invention to provide a process for the production of chlorinated aliphatic side chain aromatic compounds.

It is another object of the present invention to provide a process for the production of chlorinated aliphatic side chain aromatic compounds wherein nuclear chlorination is substantially inhibited.

Still another object of the present invention is to provide a process wherein compounds chlorinated in their aliphatic side chain are obtained substantially free of compounds containing nuclear chlorination.

These and other objects and advantages of the present invention will be readily apparent from the ensuing description and examples.

The process of the present invention for the selective chlorination of aliphatic side chains of aromatic compounds in the presence of conditions which promote nuclear chlorination comprises contacting aromatic compounds having aliphatic or partially halogenated aliphatic side chains with chlorine in the presence of a compound of the following formula:

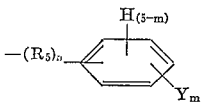
(I)

wherein M is selected from the group consisting of phosphorous, arsenic, P=O, As=O,

and

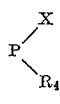

X is halogen; $R_4$ is selected from the group consisting of halogen and Z; and Z, $R_1$, $R_2$ and $R_3$ are independently selected from the group consisting of alkyl, haloalkyl, aryl, aralkyl, haloaryl, alkylaryl, haloaralkyl, alkylaralkyl, haloalkylaralky and haoalkylaryl.

It is preferred to utilize in the above process an amount effective to inhibit nuclear chlorination of a compound of the above formula wherein M is selected from the group consisting of phosphorus, arsenic, P=O, As=O,

and

X is selected from the group consisting of chlorine, bromine and iodine; $R_4$ is selected from the group consisting of chlorine, bromine, iodine and Z; and Z, $R_1$, $R_2$ and $R_3$ are independently selected from the group consisting of alkyl and haloalkyl containing from one to ten carbon atoms and $$-(R_5)_n - \underset{Y_m}{\overset{H_{(5-m)}}{\bigcirc}}$$

wherein $n$ is an integer from 0 to 1, $R_5$ is an alkylene group containing from one to ten carbon atoms; Y is selected from the group consisting of chlorine, bromine and alkyl and haloalkyl containing from one to ten carbon atoms, and $m$ is an integer from 0 to 5.

The process of the present invention is particularly valuable when performed in the dark or exposed to light in the presence or absence of actinic radiation, within a temperature range of from about 65° to about 190° C. and preferably within a temperature range of from about 80° to about 140° C.

The compounds of Formula I which are useful to inhibit nuclear chlorination in the process of the present invention are exemplified by: trimethylphosphine, trimethylphosphine oxide, trimethylphosphine dichloride, trimethylphosphine dibromide, trimethylphosphine diiodide, tetramethylphosphonium chloride, trimethylarsine, trimethylarsine oxide, tetramethylarsonium iodide, ethyldimethylphosphine, diethylmethylarsine, diethylmethylphosphine, ethyldimethylarsonium iodide, triethylarsine oxide, triethylphosphine, triethylarsine, triethylphosphine oxide, butyldimethylphosphine, butyldimethylarsine, butyldimethylphosphine oxide, trioctylphosphine, trioctylphosphine dichloride, trioctylphosphine oxide, (trifluoromethyl) dimethylphosphine, (trifluoromethyl) dimethylarsine, tris(trifluoromethyl) phosphine, tris(trifluoromethyl) arsine, triphenylphosphine, triphenylarsine, triphenylphosphine oxide, triphenylphosphine dichloride, benzyltriphenylphosphonium chloride, methyltriphenylphosphonium chloride, diphenyltolylphosphine oxide, diphenyltolylarsine, benzyldiphenylphosphine oxide, benzyldiphenylphosphine, dibenzylphenylphosphine, dibenzylphenylphosphine oxide, phenyldi-p-tolylarsine dichloride, tri-p-tolylarsine, tri-p-tolylphosphine, tri-p-tolylphosphine oxide, (o-chlorophenyl) diphenylarsine, (o-bromophenyl) diphenylphosphine, (o-chlorophenyl) diphenylphosphine, tris(p-chlorophenyl) phosphine oxide, (p-bromophenyl) - phenyl - p - tolylarsine, (dibromomethyl) triphenylphosphonium bromide, (p-ethylphenyl) phenyl-p-tolylarsine, and the like.

The compounds of the Formula I are utilized in the process of the present invention, preferably in an amount effective to inhibit nuclear chlorination. It is preferred to add from about 0.0005% to about 1% and more preferably to add from about 0.0015% to about 0.1% of said compound for each part per million of iron contamination present. Iron contamination is useful as a measure of the contaminants of the starting material. Use of the amount of the compound of Formula I presented above effectively reduces nuclear chlorination.

Aliphatic side chain aromatic compounds which can be chlorinated by the process of the present invention are known to the art. Among the most common of these compounds are: toluene, o-, m-and-p-xylene, ethylbenzene, and the like. Aromatic compounds having partially chlorinated side chains, such as benzyl chloride and benzal chloride, can also be used as the starting material for this process.

Increased yield of desired chlorinated side chain compound and a decrease in the amount of nuclear chlorinated compounds in the product can be obtained by chlorinating according to the process of the present invention in the presence of both a compound of Formula I and a catalytic amount of a free radical catalyst. This combination provides a synergistic effect in the chlorination process. The results of chlorinating with this combination cannot be obtained by either additive alone, nor are they predictable from the action of each alone. A preferred amount of free radical catalyst is from about 0.05 to about 1% by weight based on the weight of starting material, and more preferably from about 0.06 to about 0.2% by weight of the starting material.

Suitable sources for the free radical catalysts are organic peroxides, hydroperoxides, oximes, nitriles, azoalkyls, azoaromatics, and diazoaromatic compounds. More particularly, the following compounds are especially useful as free radical sources: triphenyl methyl azobenzene, 2-azopropane, diazoaminobenzene, diazoamino-p-toluene, benzene diazodimethyl amide, tetraphenyl succinic acid dinitrile, acetaldehyde, 2,4-dichlorobenzoyl peroxide, lauryl peroxide, di-t-butyl peroxide, benzoyl peroxide, acetoxime, di-ethyl ketoxime, methyl propyl ketoxime, acetophenone oxime, pinacoline oxime, methyl decyl oxime, acetone hydrazone, acetaldazine, dimethyl ketazine, methyl-n-propyl ketazine, methyl n-butyl ketazine, methyl phenyl ketazine, methyl decyl ketazine, azobisisobutyronitrile, 1-azocyclohexane carbonitrile, and di-t-amyl peroxide. Benzoyl peroxide is the preferred catalyst, having a reasonable dissociation rate at the temperatures at which the reaction is to be performed. The presence of a free radical catalyst is particularly desirable when the chlorination is to be performed in the absence of light.

The process of the present invention produces aromatic compounds having chlorinated side chains, substantially free from nuclear chlorinated compounds. The effectiveness of the process of the present invention in inhibiting nuclear chlorination can be determined by measuring the purity of the product. One method of measuring the purity of the product is to determine the percent of ring chlorinated compounds in the product by gas chromatographic analysis or other means. Another method of determining the purity of the product is to measure the freezing point of the product. This latter method is particularly effective when the desired product is benzotrichloride. Benzotrichloride has a melting point of $-4.75°$ C. It is also known that the freezing point of benzotrichloride is depressed when contaminants such as nuclear chlorinated aromatic compounds are present.

The process of the present invention for the selective chlorination of aliphatic side chain aromatic compounds would be more clearly understood from the following examples which are presented by way of illustration and are not intended to limit the scope of this invention.

*Example I*

Toluene (645 g. 7 moles), which assayed at more than 99.9% toluene was contaminated with iron (1 p.p.m.) in the form of ferric chloride and was placed in a Pyrex glass reactor. Triphenylphosphine (0.1% by weight) was added to the contaminated toluene charge and benzoyl peroxide (0.1% by weight) was also added throughout the chlorination. The reaction mixture was irradiated with ultraviolet light supplied by a 275-watt sun lamp positioned at a distance of 18 inches from the side of the reactor. Chlorine gas was filtered through glass wool and introduced beneath the surface of the reaction mixture through a fritted glass sparger at a rate of 0.5 lb. per hour. The reaction mixture was heated to a temperature which varied from 66 to 193° C. over a period of 7 hours. The chlorination was halted and the pale yellow product was determined to be benzotrichloride. The product had a specific gravity of 1.375 at 25° C., a freeze point of $-5.8°$ C. and a ring chlorine content of 0.26%. Gas chromatographic analysis of a sample taken during the chlorination when the reaction mixture had a specific gravity of 1.280 showed that the product contained 0.11 mole percent ring chlorine compounds.

*Example II*

A continuous chlorinator consisting of an electrically heated vertical glass tube (3' x 1") with a chlorine inlet near the bottom, a thermowell, a two-liter defoaming section at the top fitted with a condenser, a toluene feed opening, and a continuous discharge arm which could regulate the reactor level was charged with toluene containing triphenylphosphine (14 parts per million based on the toluene charge) and benzoyl peroxide (0.1% based on the toluene charge). The apparatus was completely shielded from all light. Toluene, containing the above additives, was pumped into the reactor at a constant rate using a proportionating pump. The temperature of the reactor was held at 131–136° C. while chlorine (an excess over the stoichiometric amount) was sparged into the reactor. The produce was composed of 7.8% toluene, 33.5% benzyl chloride, 45.5% benzal chloride and 13.2% benzotrichloride, and had a total ring chlorine content of 0.15 wt. percent. Without the use of additives, and using the same equipment and conditions, the product had a ring chlorine content of 1.09 wt. percent.

*Example III*

The procedure of Example I and the materials used therein, was repeated except that the benzoyl peroxide was omitted. The reaction mixture was heated at a temperature which varied from 68 to 189° C. over a period of 7.0 hours. The chlorination was halted and a pale yellow liquid product was recovered which was determined to be benzotrichloride. The product had a specific gravity of 1.375 at 25° C., a freeze point of $-5.9°$ C. and a ring chlorine content of 0.34%. Gas chromatographic analysis on a sample taken at 1.280 specific gravity at 25° C. showed that the product contained 0.18 mole percent ring chlorine compounds.

*Example IV*

A glass-lined chlorinator equipped with a chlorine gas sparger inlet, light wells for ultraviolet light, means for external heating and cooling and means for maintaining reflux was charged with toluene assaying at more than 99.9% toluene. Triphenylphosphine (14 p.p.m.) was charged to the reactor. Ultraviolet lamps were placed in the light wells and turned on. Chlorine gas from a cylinder was bubbled into the reaction mixture over a period of 6.1 hours while the reaction mixture was maintained at a temperature of from 123 to 192° C. The reaction was halted and the product of the reaction was found to be benzotrichloride. The product had a specific gravity of 1.378 at 25° C., a freezing point of $-6.8°$ C. and a ring chlorine content of 0.34%. The product was contaminated with 0.38 p.p.m. of iron.

*Example V*

The chlorinator described in the previous example was charged with toluene and triphenylphosphine (14 p.p.m.). This example was performed without using any ultraviolet or external light source. A 5% solution of benzoyl peroxide in benzotrichloride was added throughout the chlorination reaction so that at the end of the reaction 0.08% by weight benzoyl peroxide based on the toluene charged had been added. Chlorine gas was bubbled through the reaction mixture over a period of 8.25 hours while the reaction mixture was maintained at a temperature of from 82 to 142° C. The chlorination was halted and the product determined to be benzotrichloride. The product had a specific gravity of 1.382 at 25° C., a freezing point of —5.9° C. and a ring chlorine content of 0.6%. The product was contaminated with 0.23 p.p.m. iron.

*Example VI*

The procedure and materials detailed in Example I are repeated, except that triphenylphospine oxide is substituted for triphenylphosphine. After the chlorination is halted, the pale yellow product is substantially pure benzotrichloride.

*Example VII*

The procedure of Example I, and the materials used therein, are repeated except that triphenylphosphine dichloride is substituted for triphenylphosphine. After the chlorination is halted the reaction product is determined to be substantially pure benzotrichloride.

In a similar manner the other compounds of Formula I heretofore described can be used with or without the described free radical catalysts both in chlorinations without actinic radiation and in photochlorinations to obtain substantially pure aromatic compounds having chlorinated aliphatic side chains. In this manner, benzal chloride, benzyl chloride, α- and β-chloroethylbenzene, α-chlorodiethylbenzene, β-chloro-n-propylbenzene, xylyl chloride, xylylene dichloride, and the like, can be produced readily.

To illustrate the effectiveness of the process of the present invention in inhibiting nuclear chlorination and effecting side chain chlorination the following comparative examples are presented. In these examples chlorination is performed with and without the preferred free radical catalyst benzoyl peroxide.

*Example VIII*

Toluene, which assayed at more than 99.9% toluene was contaminated with iron (1 p.p.m.) in the form of ferric chloride. The contaminated toluene was placed in a glass reactor which was then irradiated with ultraviolet light supplied by a 275-watt sun lamp placed at a distance of 18″ from the reactor. Chlorine gas was filtered through glass wool and introduced at a rate of 0.5 pound per hour beneath the surface of the reaction mixture by means of a fritted glass sparger. The reaction mixture was stirred and heated at a temperature range of from 65 to 188° C. over a period of 7 hours. The chlorination was halted and the product was found to be a dark colored liquid having a specific gravity of only 1.310 at 25° C. (benzotrichloride has a specific gravity of 1.372 at 25° C.). The product did not freeze at temperatures as low as —10° C. whereas benzotrichloride has a freezing point of —4.75° C. The product was found to contain 0.81% ring chlorine compounds.

*Example IX*

The procedure and materials detailed in the previous example was repeated except that benzoyl peroxide (0.1% by weight) was added to the contaminated toluene. The reaction mixture was stirred and heated and chlorine gas bubbled into the reaction mixture at a rate of 0.5 lb. per hour at a temperature of from 65 to 186° C. over a period of 7 hours. The reaction product was found to be a dark red fluorescent liquid having a specific gravity of 1.346 at 25° C., a ring chlorine content of 0.88% and the product did not freeze at temperatures as low as —10° C.

*Example X*

A glass lined chlorinator equipped with a chlorine gas sparger, two light wells for ultraviolet light, means for heating and cooling and means for reflux was charged with toluene having an assay of more than 99.9% toluene. Chlorine gas was bubbled into the reactor over a period of 6.5 hours while the reaction mixture was maintained at 110–197° C. The reaction product had a specific gravity of 1.380 at 25° C. and a freezing point of —7.8° C. Upon analysis, the product was found to have a ring chlorine content of 1.2%. The product was found to contain 0.18 p.p.m. iron.

It is unusual and unexpected that the phosphine and arsine compounds of Formula I inhibit nuclear chlorination and assist side chain chlorination. According to U.S. Patent No. 2,817,633, Example 1, Mark XX, a trialkylaryl phosphite, when added to meta-xylene in a photochlorination permitted the reaction mixture to turn dark brown and chlorine absorption stopped after two hours, demonstrating that nuclear substitution and other undesirable effects had occurred. The phosphite could only be used effectively in combination with an amine. Unexpectedly, the phosphines and arsines described herein are effective per se to inhibit nuclear chlorination and do not require activating agents.

I claim:

1. A process for the selective chlorination of alkyl side chains of aromatic compounds in the presence of iron which comprises contacting said compounds with chlorine at a temperature of from about 65° to about 190° C., in the presence of a compound of the formula

wherein M is selected from the group consisting of phosphorus, arsenic, P=O, As=O,

and

X is a halogen; $R_4$ is selected from the group consisting of halogen and Z; and Z, $R_1$, $R_2$ and $R_3$ are independently selected from the group consisting of alkyl, haloalkyl, aryl, aralkyl, haloaryl, alkylaryl, haloaralkyl, alkylaralkyl, haloalkylaralkyl and haloalkylaryl.

2. A process for the selective chlorination of alkyl side chains of aromatic compounds in the presence of iron which comprises contacting said compounds with chlorine at a temperature of from about 65° to about 190° C. in the presence of a compound of the formula

wherein M is selected from the group consisting of phosphorus, arsenic, P=O, As=O,

and

X is selected from the group consisting of chlorine and bromine; $R_4$ is selected from the group consisting of chlorine, bromine and Z; and Z, $R_1$, $R_2$ and $R_3$ are independently selected from the group consisting of alkyl and haloalkyl containing from one to ten carbon atoms and

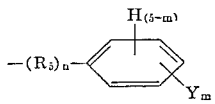

wherein $n$ is an integer from 0 to 1, $R_5$ is an alkylene group containing from one to ten carbon atoms; Y is selected from the group consisting of chlorine, bromine and alkyl and haloalkyl containing from one to ten carbon atoms, and $m$ is an integer from 0 to 5.

3. The process of claim 1 wherein the aromatic compound is toluene.

4. The process of claim 1 wherein the aromatic compound is xylene.

5. The process of claim 1 wherein the aromatic compound is ethylbenzene.

6. A process for the chlorination of an alkyl side chain of an aromatic compound in the presence of iron which comprises contacting said compound with chlorine at a temperature of from about 65° to about 190° C. in the presence of triphenylphosphine.

7. A process for the chlorination of an alkyl side chain of an aromatic compound in the presence of iron which comprises contacting said compound with chlorine at a temperature of from about 65° to about 190° C. in the presence of triphenylphosphine oxide.

8. A process for the chlorination of toluene in the presence of iron contaminants which comprises contacting toluene with chlorine at a temperature of from about 65° to about 190° C. in the presence of from 0.0005 to about 1% triphenylphosphine per part per million iron contaminant.

9. A process for the selective chlorination of alkyl side chains of aromatic compounds in the presence of iron which comprises contacting said compounds with chlorine at a temperature of from about 65° to about 190° C. in the presence of (a) a compound of the formula

wherein M is selected from the group consisting of phosphorus, arsenic, P=O, As=O,

and

X is halogen; $R_4$ is selected from the group consisting of halogen and Z; and Z, $R_1$, $R_2$ and $R_3$ are independently selected from the group consisting of alkyl, haloalkyl, aryl, aralkyl, haloaryl, alkylaryl, haloaralkyl, alkylaralkyl, haloalkylaralky and haloalkylaryl; and (b) a catalytic amount of an organic free radical catalyst.

10. A process for the chlorination of an alkyl side chain of an aromatic compound in the presence of iron which comprises contacting said compound with chlorine at a temperature from about 65° to about 190° C. in the presence of (a) triphenylphosphine and (b) a catalytic amount of benzoyl peroxide.

11. A process for the chlorination of toluene in the presence of iron contaminants which comprises contacting toluene with chlorine at a temperature of from about 65° to about 190° C. in the presence of from 0.0005 to about 1% triphenylphosphine per part per million iron contaminant and from 0.05 to about 1% benzoyl peroxide.

References Cited
UNITED STATES PATENTS 2,844,635  7/1958  Mayor _____ 260—651 X LEON ZITVER, *Primary Examiner.*

N. J. KING, H. T. MARS, *Assistant Examiners.*